W. J. COOPER.
SHUT-OFF FOR CARBURETERS IN MOTOR VEHICLES.
APPLICATION FILED DEC. 4, 1916.

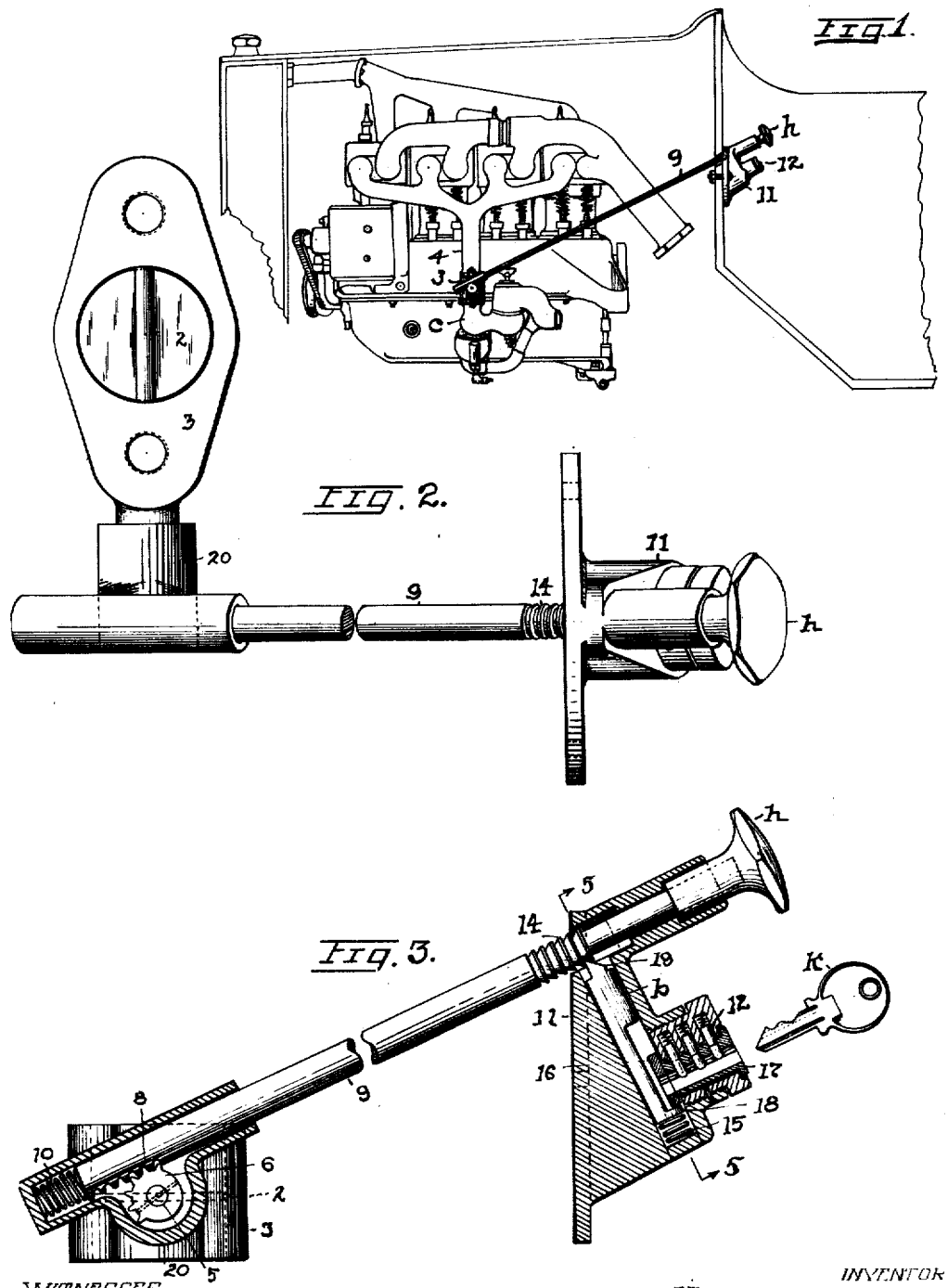

1,238,989.

Patented Sept. 4, 1917.
2 SHEETS—SHEET 2.

WITNESSES.
Geo E. Spricher

INVENTOR.
Walter J. Cooper.
By Fisher Stewart
ATTORNEYS.

UNITED STATES PATENT OFFICE.

WALTER J. COOPER, OF CLEVELAND, OHIO, ASSIGNOR OF ONE-HALF TO MICHAEL J. MARUNA, OF CLEVELAND, OHIO.

SHUT-OFF FOR CARBURETERS IN MOTOR-VEHICLES.

1,238,989.     Specification of Letters Patent.     Patented Sept. 4, 1917.

Application filed December 4, 1916. Serial No. 134,808.

*To all whom it may concern:*

Be it known that I, WALTER J. COOPER, a citizen of the United States, residing at Cleveland, in the county of Cuyahoga and State of Ohio, have invented certain new and useful Improvements in Shut-Offs for Carbureters in Motor-Vehicles, of which the following is a specification.

This invention pertains to means for controlling the fuel supply of an explosive engine in an automobile and involves a locking device adapted to operate automatically when the supply of fuel or gas to the engine is cut off and also includes an auxiliary lock requiring a key to release the parts for use again, all substantially as shown and described and particularly pointed out in the claims. Thus, one of the objects of the invention is to provide a device adapted to be mounted upon the dash of an automobile opposite the operator's seat whereby the passage of the explosive mixture from the carbureter to the engine may be variably controlled or absolutely shut off and the parts automatically locked in any given or adjusted position and unlocking effected only by the use of a key in the hands of authorized persons. A further object is to pivot the locking device upon a suitable mounting so that it may be affixed to different makes of cars where the angle or inclination of the shut-off rod differs on account of a higher or lower position of the carbureter or engine relatively to the dash or where the dash may be straight or inclined as the case may be. In operation, when the shut-off is closed and locked the fuel supply to the engine is cut off, and an unauthorized person cannot start the engine and ride away with the car.

In the accompanying drawings, Figure 1 is a side elevation of a portion of a motor vehicle showing the engine and the carbureter and my new and original shut-off device therewith. Fig. 2 is an enlarged plan view of the valve and its operating mechanism with the operating rod broken away and foreshortened, and Fig. 3 is a sectional elevation of the said mechanism lengthwise on the line of the rod.

Figure 4:
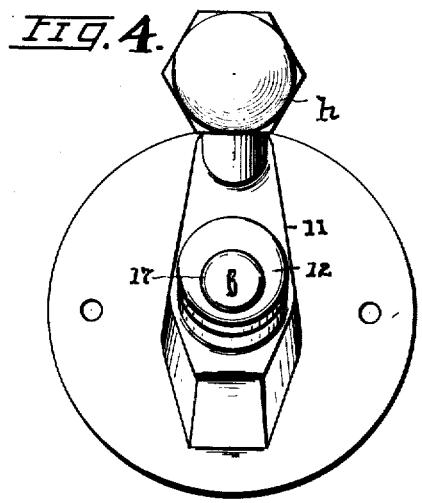
Figure 5:
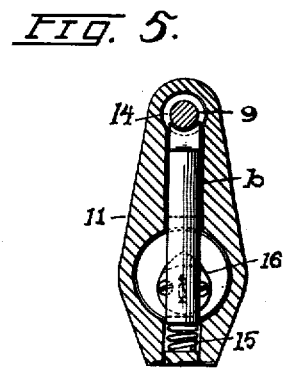
Figure 6:
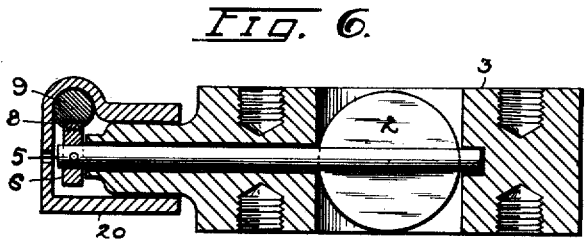
Figure 7:
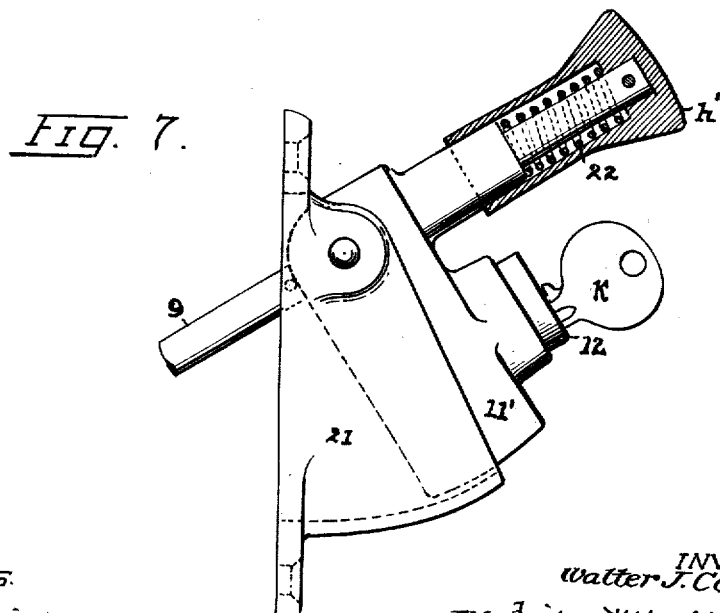

Fig. 4, Sheet 2, is an end elevation showing the hand grip of the control mechanism and the key or lock box. Fig. 5 is a cross section on line 5—5, Fig. 3, showing the locking bolt and operating eccentric, and Fig. 6 is a sectional elevation of the coupling member containing the damper valve in the passage leading from the carbureter to the engine. Fig. 7 is a side view of a modified form of lock box and mounting adapted to permit various settings thereof on different vehicles or where the parts are differently related.

Structurally, the essential parts involve the shut-off member 2, which may also be regarded as a damper or valve, and the casing 3 therefor which comprises a coupling member located in and incorporated with the pipe, passage or duct 4 leading from the carbureter *c* to the engine. The said shut-off is preferably of the damper type, adapted to be rotated and more or less entirely closed, and hence has a spindle 5 rotatably mounted in casing 3 and provided with a toothed wheel or segment 6 at its extremity outside said casing engaged by teeth 8 on the lower extremity of a rod or operating shaft 9, the said shaft being adapted to be moved lengthwise a sufficient distance to change the shut-off from open to closed position and, of course, back again to open or normal position. A spring 10 behind the end of said shaft moves the same automatically outward to open position, and the hand grip *h* is on the other or upper exposed end of said shaft at the front of the dash for convenient reach and is mounted within or upon the head 11 secured to the dash.

A Yale tumbler or other lock 12 is installed beneath the said hand grip *h* in said head and a bolt *b* having a sharpened or tooth-shaped or beveled end is adapted to engage in one of the circular tooth-shaped rings 14 about the shaft 9, as clearly seen in Fig. 3, and which serve to prevent the withdrawal of said shaft and when engagement is made. A spring 15 behind said bolt holds the bolt in working engagement with shaft 9, and the bolt is retracted or withdrawn through or by means of the cam or eccentric 16 affixed to the inner end of the rotatable barrel or cylinder 17 which receives the key *k*. The cam 16 bears upon a shoulder 18 when the cylinder is rotated, thus retracting the bolt.

A box or housing 20 is partially sleeved over the reduced extremity of the casing 3 and incloses the wheel or segment 6 and provides a bearing for the end of shaft 9 and an inclosure for spring 10.

The utility and operation of the device will be clearly understood from the foregoing description, and it is the work of a moment to push the shaft or rod 9 inward and close the shut off, either partially or entirely, and the bolt 4 holds the shaft automatically against withdrawal. Assuming the supply to be entirely cut off the engine cannot be operated. Then when the engine is to be used the key is inserted and the bolt withdrawn, whereupon the spring 10 forces shaft 9 outward until the valve is fully open. The inclined backs of the annular teeth or rings 14 on shaft 9 and the reverse bevel of the tooth-shaped end 19 of bolt $b$ engaged therewith enable the shaft to be thrust to closing position of the shut-off without withdrawing the bolt or using the key.

In Fig. 7 I show a lock-confining casing 11' pivotally mounted within a suitable inclosure and support 21 which is adapted to be fastened to the dash of the vehicle, and the shaft 9 has a hollow hand grip $h'$ containing a spring 22 to force the shaft outward. The pivoted casing as thus described permits the shaft to be placed at any angle of inclination relatively to the engine or carbureter and to be attached to any form of dash whether vertical or inclined, and it will be noted that the box 20 for the gear segment 6 and the lower end of the shaft is free to turn on the coupling member 3 so as to permit different angular adjustments of the shaft to take place as described.

It should have been stated that the casing 11, as seen in Figs. 2 and 4 and in section Fig. 3, is an entirety adapted to be rigidly fixed on the dash and constructed to carry the tumbler mechanism, the bolt $b$ and rod 9, while in Fig. 7, the support 21 is fastened to the dash and the part 11' is pivotally mounted thereon at 10, and carries the tumbler, the locking bolt and the rod 9. This affords the change of angle or inclination of rod 9 hereinbefore described.

What I claim is:

1. In means for controlling the fuel supply of an explosive engine in an automobile, a mounting adapted to be fixed to the dash of the automobile and a key-controlled locking device therewith having a casing pivotally secured to said mounting, a valve-operating rod slidably mounted within said casing in locking relation with said device, in combination with a fuel controlling valve having gear connection with said rod and a box containing said connections adapted to turn to permit different angular adjustments of said rod.

2. In means for controlling the fuel supply of an explosive engine, a fuel-controlling valve and an operating rod having toothed controlling engagement therewith and slidably axially, a bolt adapted to effect self-locking of said rod subsequent to valve-closing movements thereof, a box confining the lower end of said rod and a spring in said box bearing against the end of said rod tending to produce return movement of said rod after an operation thereof, in combination with a fixed support and a casing pivotally mounted therein containing said self locking bolt and key-controlled locking means adapted to engage the end of said self-locking bolt to release the same from engagement with said rod, the said rod being supported in said casing and adjustable therewith.

3. In means for controlling the fuel supply of an explosive engine, a fuel-controlling valve and an operating rod having toothed controlling engagement therewith and slidable axially, in combination with a bolt adapted to effect self-locking of said rod subsequent to valve-closing movements thereof and a spring tending to produce return movement of said rod after an operation thereof, the said means comprising a pivotally mounted casing containing said self locking bolt and a key-controlled locking device adapted to engage the end of said self-locking bolt to release the same from holding engagement with said rod.

Signed at Cleveland in the county of Cuyahoga, and State of Ohio, this 14th day of November, 1916.

WALTER J. COOPER.